United States Patent [19]

Nagano

[11] Patent Number: 4,658,303
[45] Date of Patent: Apr. 14, 1987

[54] IMAGE READING APPARATUS

[75] Inventor: Fumikazu Nagano, Yamatokoriyama, Japan

[73] Assignee: Sharp Kabushiki Kaisha, Osaka, Japan

[21] Appl. No.: 720,712

[22] Filed: Apr. 8, 1985

[30] Foreign Application Priority Data

Apr. 9, 1984 [JP] Japan .................................. 59-71605

[51] Int. Cl.⁴ .......................... H04N 1/46; H04N 3/15
[52] U.S. Cl. ..................................... 358/294; 358/75; 358/213
[58] Field of Search .................... 358/75, 78, 80, 293, 358/294, 213, 214

[56] References Cited

U.S. PATENT DOCUMENTS 4,472,744 9/1984 Inoue et al. ......................... 358/293
4,594,614 6/1986 Frank .................................... 358/214

FOREIGN PATENT DOCUMENTS 0148465 9/1982 Japan ................................... 358/293

Primary Examiner—Howard W. Britton
Attorney, Agent, or Firm—Birch, Stewart, Kolasch & Birch

[57] ABSTRACT

An image reading apparatus comprising a lighting control means, an analog shift means, a transfer control means and a clock pulse control means. According to the controlling operation of a lighting control means for lighting the light source during a given time period, the output of the CCD sensor is prohibited from being fed to the analog shift means while the light source is turned on, with the output of the CCD sensor being adapted to be fed to the analog shift means and to shift to an output circuit while the light source is turned off, thus preventing the accumulation of light electric-charges, caused by light leakage within a light-source lighting period, and preventing mixed color reading through the remaining electric charges, with the result that the color resolution of the red, green, blue can be performed with accuracy.

4 Claims, 9 Drawing Figures

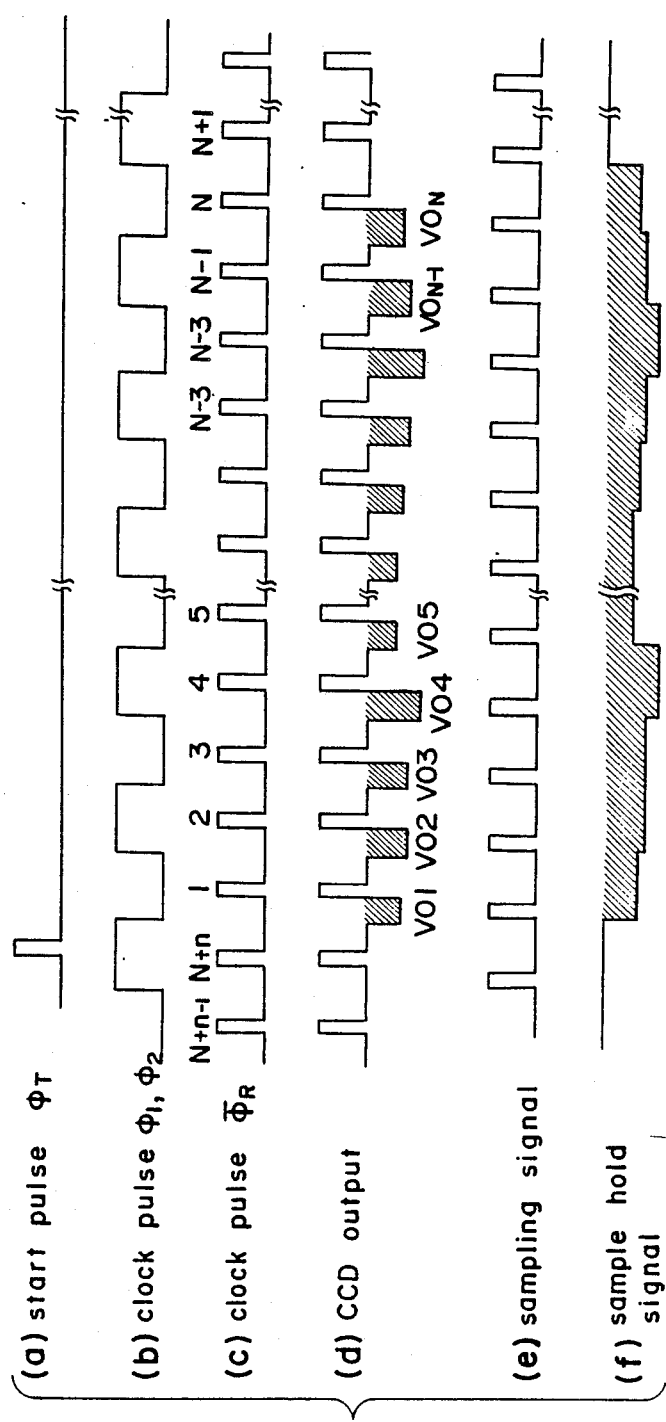

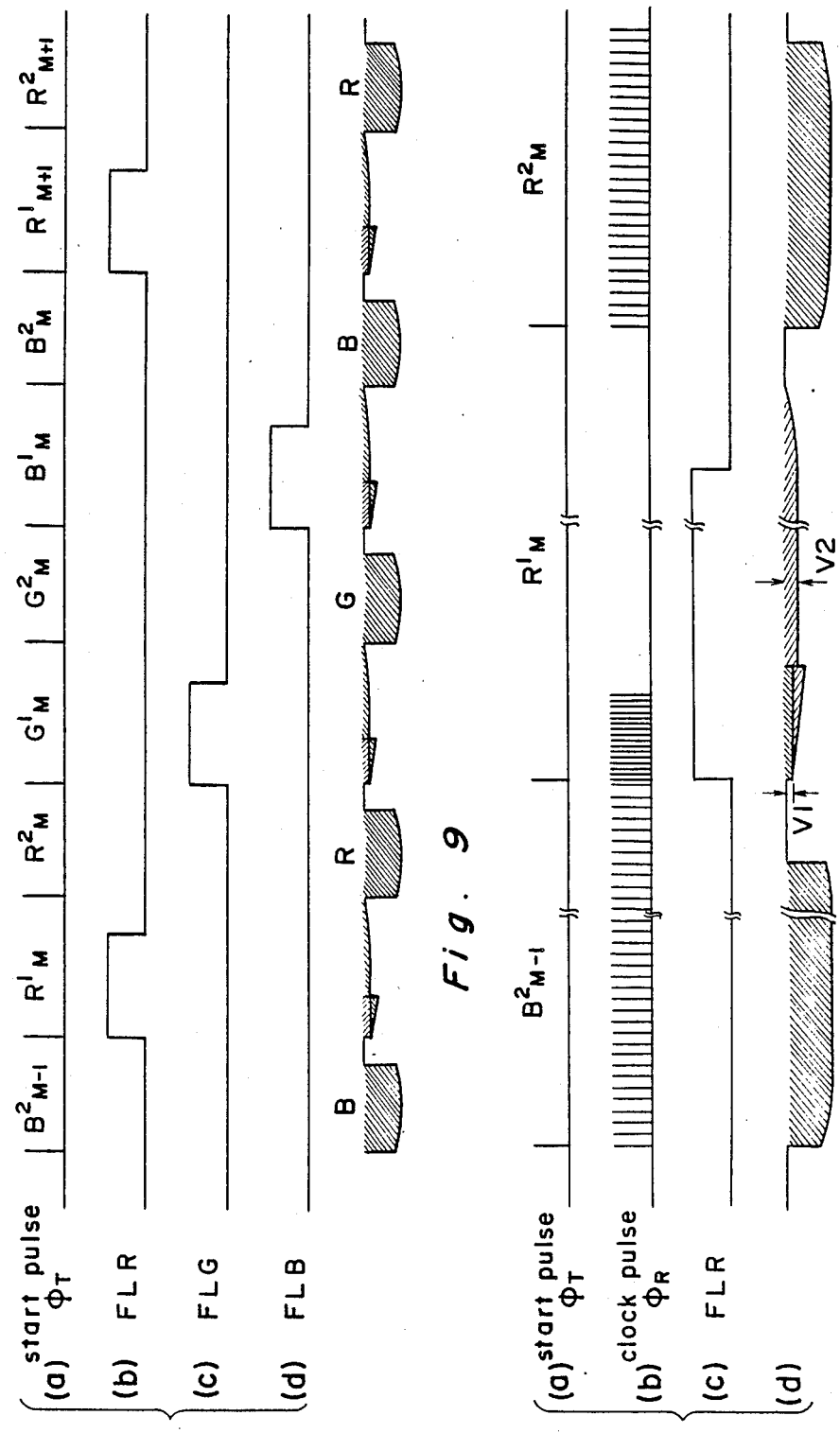

IMAGE READING APPARATUS

BACKGROUND OF THE INVENTION

1. Field of the Invention

The present invention relates to an image reading apparatus and more particularly, to an image reading apparatus applied to a color scanner, a color facsimile or the like, which uses a unit CCD sensor to flash sequentially three fluorescent lamps of red, green and blue lights as light sources in accordance with the scanning period of the CCD sensor, and to detect by the CCD sensor the reflected lights from the image to perform the color resolution.

2. Description of the Prior Art

Conventionally, FIG. 1 through FIG. 3 show an optical system in an image reading apparatus which is the background of this invention, and to which one embodiment of the present invention is applied. In an example shown in FIG. 1, there are provided an R fluorescent lamp 2 which transmits a red light to a color manuscript 1, a G fluorescent lamp 3 which transmits a green light thereto, and a B fluorescent lamp 4 which transmits a blue light thereto. The reflected lights from the color manuscript 1 in accordance with the lights from the fluorescent lamps 2 through 4 are focused with a lens 6 from a mirror 5 and are input into the CCD sensor 7.

In an example shown in FIG. 2, only a fluorescent lamp 8 of ordinary light is provided for the color manuscript 1. The reflected light from the color manuscript 1 in accordance with the light from the fluorescent lamp 8 is reflected by the mirror 5 and is separated into the respective light components of the red, green, blue of the color manuscript 1 by a filter disk 9 so as to be input into the CCD sensor 7 through the lens 6.

In an example shown in FIG. 3, a dichroic mirror 10, instead of a filter disk 9 shown in FIG. 2, is disposed behind the lens 6 to separate the light of the color manuscript 1 into the light components of the red, green, blue thereof so as to be respectively input into an R reading CCD sensor 11, a G reading CCD sensor 12 and a B reading CCD sensor 13.

The CCD sensors 7, 11 through 13 shown in the above-described FIG. 1 through FIG. 3 output light electric-charge from the light incidence. The light electric-charge not shown is loaded on an analog shift register and is sequentially shifted in accordance with a clock pulse. The electric charge caused due to some light leakage is added later while the content loaded on the analog shift register is being shifted. Namely, the electric charge from the sensor portion to the analog shift register is not completely transferred by one shift, thus resulting in some short shipment of the remaining load. The above-described two facts are responsible for deterioration in the accuracy of the color resolution in the conventional image reading apparatus, and measures against them have not been taken at all or have been neglected.

SUMMARY OF THE INVENTION

Accordingly, an essential object of the present invention is to provide an improved image reading apparatus, which is free from the above-described problems so that the color resolution of the red, green, blue may be performed with accuracy.

In accomplishing the object of the present invention, according to one preferred embodiment of the present invention, there is provided an improved image reading apparatus which is adopted to detect by the use of a CCD sensor the lights from a light source reflected by images, comprising: a lighting control means for lighting said light source only during a given period; an analog shift means which receives a plurality of analog signals for output in parallel from said CCD sensor and shifts them in accordance with a clock pulse; a transfer control means which prohibits the CCD sensor outputs from being fed to said analog shift means while said light source is turned on, and feeds the CCD sensor outputs to said analog shift means while said light source is turned off; a clock pulse control means which feeds the clock pulse to said analog shift means to perform a control operation for shifting the contents of the analog shift means. With this construction, in accordance with the control of the lighting control means for turning on a light source only during a given period, the output of the CCD sensor is prohibited from being fed to an analog shift means while the light source is on, while the transfer is controlled so that the output of the CCD sensor may be fed to the analog shift means while the light source is off, and the control is performed such that a clock pulse is given to the analog shift means to shift the contents of the analog shift means.

BRIEF DESCRIPTION OF THE DRAWINGS

This and other objects and features of the present invention will become apparent from the following description taken in conjunction with the preferred embodiment thereof with reference to the accompanying drawings, in which:

FIG. 7 is a wave-form view of each portion in FIG. 5; and

FIG. 8 and FIG. 9 are wave-form views of an image reading apparatus in accordance with one embodiment of the present invention.

DETAILED DESCRIPTION OF THE EMBODIMENT

Figure 1:
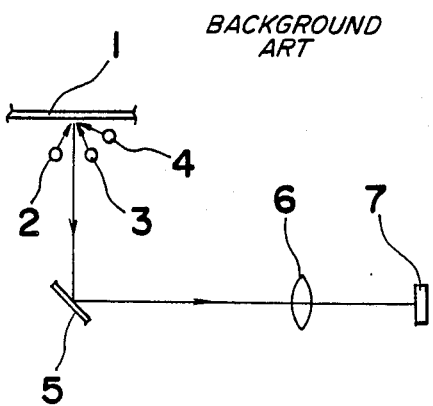
FIG. 1 through FIG. 3 are views each showing an optical system in an image reading apparatus (already referred to)
Figure 2:
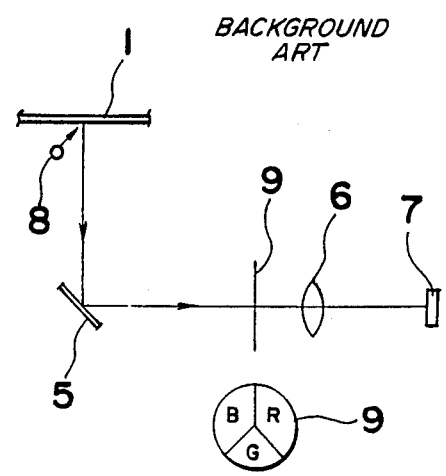
Figure 3:
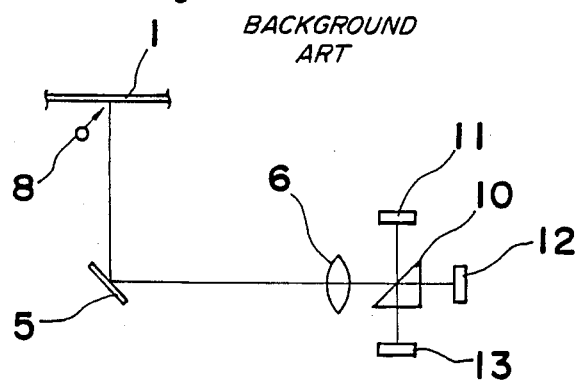
Figure 4:
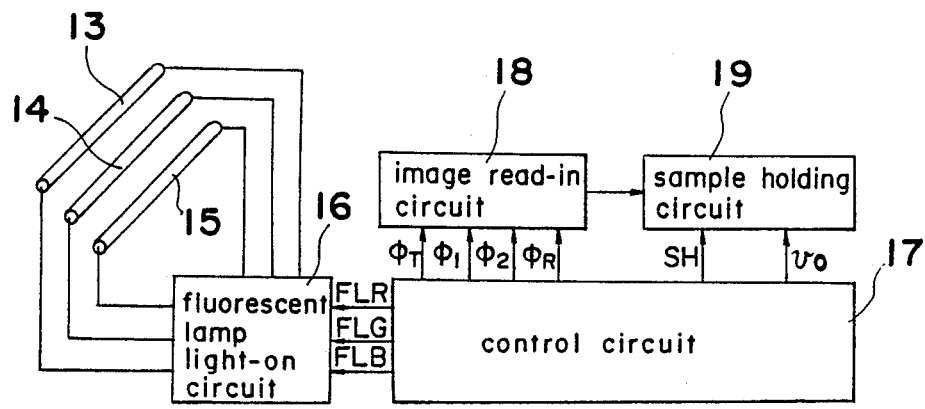
FIG. 4 is a schematic block diagram of an optical system in one embodiment of the present invention.

The entire construction of an image reading apparatus in one embodiment of the present invention will be described with reference to FIG. 4. In FIG. 4, an R fluorescent lamp 13, a G fluorescent lamp 14 and a B fluorescent lamp 15 are adapted to illuminate the red, green, blue lights respectively on the images. The fluorescent-lamp lighting circuit 16 alternately lights, at a constant period, the R fluorescent lamp 13, the G fluorescent lamp 14 and the B fluorescent lamp 15 respectively in accordance with lighting control signals FLR, FLG and FLB given from a control circuit 17. The image reading portion 18, which will be described in detail in FIG. 5 to be described later, is adapted to read the reflection lights by a CCD sensor, which are lights from the R fluorescent lamp 13, the G fluorescent lamp 14, and the B fluorescent lamp 15 reflected by the images. A start pulse $\phi_T$, cross pulses $\phi_1$, $\phi_2$ and a reset pulse $\phi_R$ are fed to the image reading portion 18 from the control circuit 17. An image signal VO read out by the image reading portion 18 is fed to a sample hold circuit 19. A sampling pulse SH is fed from the control circuit 17 to the sample hold circuit 19. The sample hold circuit 19 holds by samples a reading signal VO from the image reading portion 18 in accordance with this sampling pulse SH. An output signal vo sample-held is given to the control circuit 17.

The detailed construction of the image reading portion 18 shown in the above-described FIG. 4 will be described hereinafter with reference to FIG. 5. The CCD sensor 181 outputs light electric-charges in accordance with the reflected lights from the images. The light electric-charges are fed to a transfer gate 182. A start pulse $\phi_T$ is fed to the transfer gate 182. The transfer gate 182 transfers to an analog register 183 the light electric-charges coming from the CCD sensor 181 in accordance with the start pulse $\phi_T$. Clock pulses $\phi_1$, $\phi_2$ are fed to the analog shift register 183. The analog shift register 183 sequentially outputs in accordance with the clock pulses $\phi_1$, $\phi_2$ the light electric-charges of the CCD sensor 181 transferred from the transfer gate 182 to feed them to an output buffer 184. The output buffer 184 sequentially outputs the image data. The light electric-charge is reset by the reset pulse and the following light electric-charge is received.

Figures 5, 6:
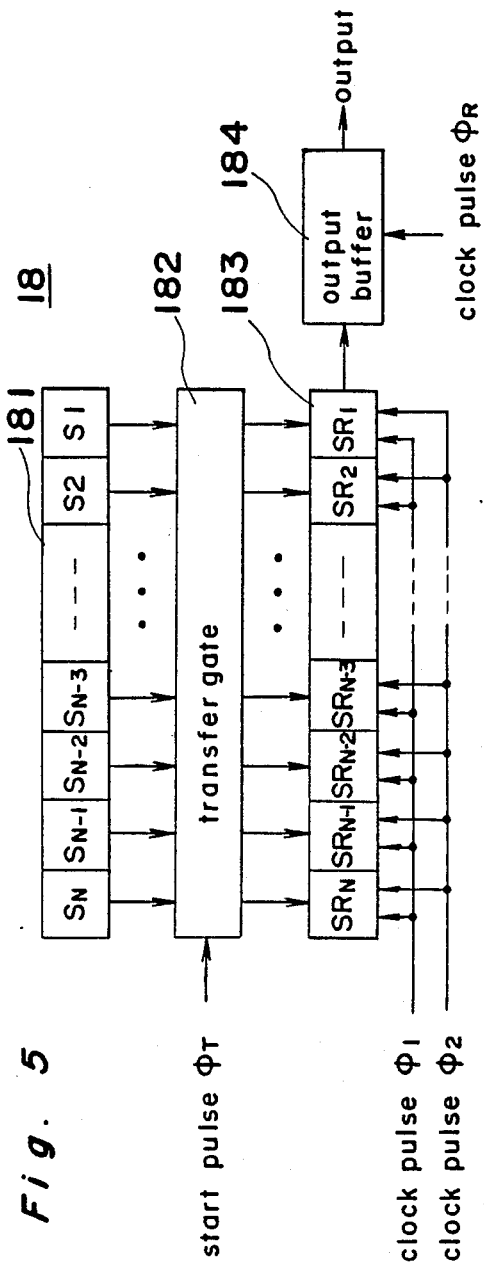
FIG. 5 is a detailed block diagram of an image reading portion shown in FIG. 4.
FIG. 6 is a wave-form view of each portion in FIG. 4.

The operation of an image reading apparatus shown in FIG. 4 and FIG. 5 will be described hereinafter with reference to FIG. 6 and FIG. 7, showing wave-forms of each portion of FIGS. 4 and 5, respectively. A fluorescent lamp lighting circuit 16 sequentially flashes an R fluorescent lamp 13, a G fluorescent lamp 14, and a B fluorescent lamp 15 in accordance with lighting control signals FLR, FLG and FLB to be fed from the control circuit 17. Namely, when the lighting control signal FLR becomes "1", the R fluorescent lamp 13 lights, when the lighting control signal FLG becomes "1", the G fluorescent lamp 14 lights, and when the lighting control signal FLB becomes "1", the B fluorescent lamp 15 lights. The reflected lights from the images in accordance with the lights from the R fluorescent lamp 13, the G fluorescent 14 and the B fluorescent lamp 15 are detected by the CCD sensor 181. Namely, when the R fluorescent lamp 13 lights on during a period of a scanning period M shown in FIG. 6, the light electric-charges corresponding to the R information of the image are accumulated among each regions $S_1$, $S_2$, $S_3$..., $S_{N-1}$, $S_N$ in the CCD sensor 181. And the light electric charges accumulated among the regions $S_1$, $S_2$, $S_3$..., $S_{N-1}$, $S_N$ of the CCD sensor 181 by a start pulse $\phi_T$ in the following scanning period M+1 are loaded on the regions SR, $SR_2$, $SR_3$... $SR_{N-1}$, $SR_N$ of an analog shift register 183 by the transfer gate 182.

The analog shift register 183 transfers the loaded contents to an output buffer 184 in accordance with the clock pulses $\phi_1$, $\phi_2$. The output buffer 184 converts in photoelectricity the light electric-charge transferred from the analog shift register 183 and outputs it as a CCD output signal VO. It is to be noted that the light electric-charges to be transferred sequentially from the analog shift register 183 are reset each time within the output buffer 184 by a reset pulse $\phi_R$. Accordingly, as shown in FIG. 6, CCD output signals $VO_1$, $VO_2$, $VO_3$..., $VO_N$ corresponding to the light electric-charges accumulated on the regions $S_1$, $S_2$, $S_3$... $S_N$ are output as shown within the scanning period M+1 of the start pulse $\phi_T$. They are the normal CCD output signals.

The CCD output signal should be basically "0" in the scanning period M in the start pulse $\phi_r$ shown in FIG. 6. However, if the lights are illuminated on the chip of the CCD sensor even while the light electric-charges are being transferred to the output buffer 184 by an analog shift register 183 disposed within the image reading portion 18, some lights are incident into the analog shift register 183 to cause light electric-charges to add them to the normal light-electric charges, with the result that some CCD output signals come. The CCD output signals are different in level within the period of the scanning period M. Namely, $VO_N$ shows a considerable level of additive light-electric charges while the $VO_1$ is almost "0". This is because it takes a short time for the light electric-charge accumulated on the region $S_1$ of the CCD sensor 181 to be transferred to the region $SR_1$ of the analog shift register 183 and to reach the output buffer 184, while for $VO_N$, it takes a time $T_1$ in FIG. 6 for the light electric-charge accumulated on the $S_N$ of the CCD sensor 181 to reach the output buffer from the transfer of the light electric-charge to the region $SR_N$ of the analog shift register 183 so that the additive effect of the light electric-charge due to the light leakage into the analog shift register 183 is large. It is costly to completely remove such an adding effect as described hereinabove.

In FIG. 5, the accumulated light electric-charges on the sensor portion 181 are not completely transferred to the analog shift register portion by one time period of start pulse $\phi_r$, thus 3 through 4% of the light electric-charges remain. The present invention is provided to prevent deterioration in the accuracy of the color resolution, which is caused through the adding effect caused by the light electric-charges of the incident light which remain in the analog shift register portion and the incomplete transfer to the analog shift register portion.

The operation of one embodiment of the present invention will be described hereinafter with reference to FIG. 8 and FIG. 9, showing respectively wave-form views of an image reading apparatus. Referring to FIG. 8, the control circuit 17 operates at the scanning periods of $B^2_{M-1}$, $R^1_M$, $M^2_M$, $G^1_M$, $G^2_M$, $B^1_M$, $B^2_m$, $R^1_{M+1}$, $R^2_{M+1}$, $G^1_{M+1}$. At the scanning periods of $R^1_M$, $G^1_M$, and $B^1_M$, the R fluorescent lamp 13, the G fluorescent lamp 14 and the B fluorescent lamp 15 are sequentially flashed by the fluorescent lamp lighting circuit 16. At this time, the output of the CCD sensor 181 is neglected. In the embodiment of the present invention, the output signals of the CCD sensor 181 including the respective pure R information, G information, B information which appear at the scanning periods $R^2_M$, $G^2_M$ and $B^2_M$ are used.

More details will be give with reference to FIG. 9. Among clock pulses for transferring the light electric-charges to the output buffer 184 from the analog shift register 183 in FIG. 9, a clock pulse at the scanning period of a luminous timing is rendered faster than a clock pulse of the reading period. The output signal level $v_1$ of the CCD sensor 181 which appears at the scanning period $R_M$ is a short-shipped portion of the light electric-charge corresponding to the B information at the former period. Also, the level $v_2$ is an output corresponding to the light electric-charge caused by the light leakage into the analog shift register 183. Light electric-charges caused by some light leakage which remains in the regions $SR_1$, $SR_2$, ... $SR_N$ of the analog shift register 183 at a time the fluorescent lamp 13 has turned off in the scanning period $R_M$, i.e., at the $N+n_2$ of the time of the reset pulse $\phi_R$ is discharged. This level is $SR_1 > SR_2 > SR_3 > \ldots > SR_N \approx 0$. To discharge it from the analog shift register 183, transfer clock pulses are sent by $n_3$ portions in excess ($n_3 = N$ in this invention) from it even after the R fluorescent lamp 13 has been turned off. In addition, to make this time period short, the period of the transfer clock pulse in this time period is rendered faster. The clock pulse of the scanning period in the respective luminous timings of not only the R fluorescent lamp 13, but also the G fluorescent lamp 14 the B fluorescent lamp 15 is rendered faster than the clock pulse of the reading period. In a time period during which the R fluorescent lamp 13, the G fluorescent lamp 14 and the B fluorescent lamp 15 are respectively turned on, the light electric-charges from the CCD sensor 181 are prohibited from being transferred to the analog shift register 183, and in a time period during which they are turned off, the light electric-charges from the CCD sensor 181 are transferred to the analog shift register 183 so that the period of the transfer clock pulse in a given time period after the lamps have been turned off is rendered faster to discharge the light electric-charges caused by the light leakage accumulated on the analog shift register 183, with the result that the pure R, G, B which are not mixed in color are outputted as output signals corresponding to the R information, G information and B information.

Thus, in accordance with the present invention, it is so arranged that according to the controlling operation of a lighting control means for lighting the light source during a given time period, the output of the CCD sensor is prohibited from being fed to the analog shift means while the light source is turned on, and the output of the CCD sensor is adapted to be fed to the analog shift means so as to shift while the light source is turned off, thus preventing the accumulation of the light electric-charges, which is caused by light leakage within a light-source lighting period, and preventing mixed-color reading through the remaining electric charges, with the result that the color resolution of the R, G, B can be performed with accuracy.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An image reading apparatus which detects, by the use of a CCD sensor the lights from a light source reflected by images, comprising:
    lighting control means for lighting said light source only during a given period;
    analog shift means for receiving a plurality of analog signals in parallel from said CCD sensor for output to an output circuit, and shifting said analog signals in accordance with a clock pulse;
    transfer control means for prohibiting said analog signals from being provided to said analog shift means while said light source is turned on, and for providing said analog signals to said analog shift means while said light source is turned off;
    clock pulse control means for providing said clock pulse to said analog shift means to control the shifting of the contents of said analog shift means to said output circuit while said light source is turned off.

2. An image reading apparatus in accordance with claim 1, wherein said clock pulse control means includes, means for controlling said clock pulse to be provided to said analog shift means so as to discharge light electric charges, which are caused by light leakage and are accumulated on said analog shift means while prohibiting the provision of said analog signals from said CCD sensor to said analog shift means for a given time period after said light source is turned off.

3. An image reading apparatus in accordance with claim 2, wherein said clock pulse control means further includes means for shortening the period of said clock pulse to be provided to said analog shift means during said given time period.

4. An image reading apparatus in accordance with claim 1, wherein said lighting control means includes control means for performing a control operation to light said light source at the timing of a scanning period T and performing a control operation to provide to said analog shift means said analog signals from said CCD sensor in accordance with a first timing period $T+1$, but not to provide to said analog shift means said analog signals from said CCD sensor in accordance with a second timing period $T+2$.

* * * * *